3,444,182
1a-PHTHALOYLGLOTAMYLMITOMYCIN C
Masanao Matsui, Tokyo, Keizo Uzu, Shizuoka-ken, and Yasuhiro Yamada and Shigetoshi Wakaki, Tokyo, Japan, assignors to Kyowa Hakko Kogyo Co., Ltd., Tokyo, Japan, a corporation of Japan
Filed Nov. 25, 1964, Ser. No. 413,743
Int. Cl. C07d 57/00, 27/00; A61k 21/00
U.S. Cl. 260—326         1 Claim

ABSTRACT OF THE DISCLOSURE

The present invention relates to new antibiotics, more particularly, relates to new antibiotics derived from mitomycin C.

Mitomycin C is a well-known antibiotic having the formula:

and isolated from the cultured broth of *Streptomyces cespitosus*. Mitomycin C has excellent effectiveness but also has a disadvantageous effect, i.e. a poisonous effect, therefore, there has existed the restriction for the use of mitomycin C. In order to obtain less poisonous derivatives of mitomycin C, many researches have been made, e.g. monomethyl-mitomycin C, 6, 7 and 1a-substituted derivatives and etc.

The present inventors have conducted research in this field and have found several types of derivatives. In Canadian application No. 904,353, now Canadian Patent No. 743,105, granted Sept. 20, 1966, the present inventors have provided a type of derivatives of mitomycin C which has the general formula:

wherein R is alkyl radical.

In the present specification, the term "alkyl" means not only "alkyl" but also "substituted alkyl."

Several specific derivatives are exemplified in the application. The above derivatives are synthesized by reacting the reagent having alkanoyl-group such as acylchloride and carbonic acid anhydride with mitomycin C.

The present inventors have conducted further studies on the synthesis of derivatives of mitomycin C, and have found 3 specific derivatives belonging to the above-mentioned type of derivatives. Furthermore, the present inventors have found the new types of derivatives; one is obtained by treating mitomycin C with acid, and the other is the 1a-sulfonyl derivative obtained by reacting the sulfonating agent with mitomycin C.

One object of the present invention is to provide new derivatives of mitomycin C, and another object is to provide a process for the synthesis of the derivatives. A further object of the present invention is to provide less poisonous derivatives of mitomycin C. Other objects will easily be understood from the description.

According to the present invention, three specific derivatives belonging to 1a-acyl derivatives, are 1a-acetyl-, 1a-chloracetyl- and 1a-phthaloyl glutamyl-derivatives of mitomycin C, which are synthesized by reacting the corresponding acylchloride or carbonic acid anhydride with mitomycin C in preferable solvent such as water, methanol, acetone, pyridine, tetrahydrofuran, dimethylformamide and etc. in the presence of deacidifying substances such as inorganic alkali, organic bases (pyridine triethylamine). When no deacidifying substance exists in the reaction mixture, mitomycin C is decomposed by the produced acid and the yield of 1a-acyl derivative is decreased. However, this phenomenon relates to one of the new derivative of the present invention, i.e. acid-decomposed mitomcyin C. As the chemical property of mitomycin C, it has been known that mitomycin C is easily decomposed by acid, however, the decomposed product has been neither realized nor isolated. The present inventors have studied this decomposition and isolated then identified the product. The decomposition is shown by the following formula:

The derivative (I) is, however, further decomposed as follows:

therefore, it is necessary for obtaining the derivative (I)—1-hydroxy-2,7-diaminomitosene—at high yield to select the favorable conditions of acidity and reaction time, for example, when the concentration of hydrochloric acid is 0.1 N, the favourable reaction time is 10–15 min., while when the concentration is 0.005 N, the favourable reaction time is about 20 hours. As to the acid used in the decomposing reaction, inorganic acid such as hydrochloric, sulfuric, phosphoric acids and etc. and also organic acid such as acetic, citric acids and etc. may be used. The decomposition reaction is preferably carried out in suitable solvents such as water, methanol, acetone, tetrahydrofuran. The recovery of the product is favourably carried out by using chromatographic method as described in examples of the present specification.

Another type of derivatives of the present invention is 1a-sulfonyl derivatives of mitomycin C which are synthesized by reacting sulfonating reagent with mitomycin C in the preferable solvent aforementioned in the presence of deacidifying substances in order to prevent the acid decomposition. The 1a-sulfonyl derivative is shown as follows:

wherein R is alkyl (including substituted alkyl as aforementioned) or aryl group.

In carrying out the 1a-sulfonating, both aromatic and aliphatic sulfonic acid chloride and anhydride are favourably used as the sulfonating reagent.

The following examples are only for the illustration but not for the limitation of the present invention.

Example 1.—1a-acetylmitomycin C 1 g. of mitomycin C was dissolved in 10 ml. of pyridine and 2 ml. of acetic anhydride was added on stirring. Standing for 30 min. at room temperature, the reaction mixture was concentrated in vacuo. The resulting paste-like concentrate was dissolved in chloroform and the chromatographic treatment was carried out using alumina. The upper-most band was developed and eluated by 5% methanol-containing chloroform. The eluate was concentrated in vacuo, and the resulting concentrate was dissolved in acetone. Adding petroleum ether, brownish purple amorphous precipitate of 1a-acetylmitomycin C was obtained. Yield 800 mg.

*Analysis.*—Calcd. for $C_{15}H_{17}O_5N_4(CH_3CO)$; C, 54.25; H, 5.36; N, 14.89; $OH_3CO$, 11.6. Found: C, 53.70; H, 5.34; N, 13.80; $CH_3CO$, 12.14.

Figure 1:
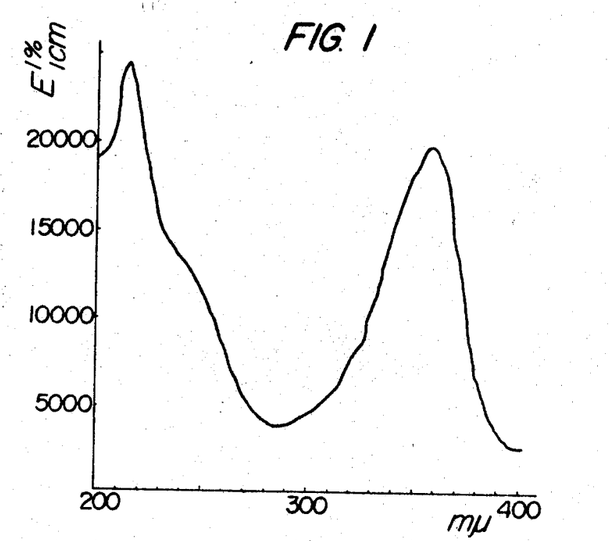

The ultraviolet adsorption in ethanol is shown in FIG. 1, and $\lambda_{max.}^{C_2H_5OH}$ 215 m$\mu$ ($\epsilon_{max.}=24{,}300$) and 258 m$\mu$ ($\epsilon_{max.}=19{,}800$)

Figures 2, 4:
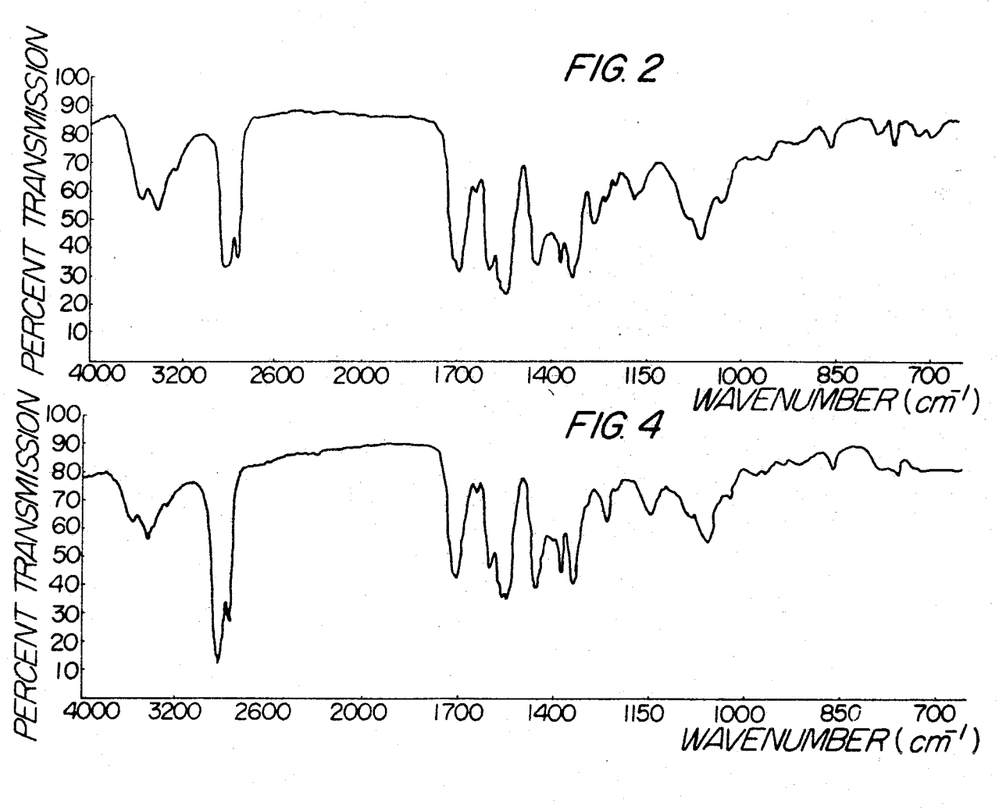

The infrared spectrum in Nujol is shown in FIG. 2.

Example 2.—1a-monochloroacetylmitomycin C 1 g. of mitomycin C was treated with 330 mg. of monochloroacetylchloride by the same procedure as in Example 1. 900 mg. of amorphous powder of monochloroacetylmitomycin C was obtained.

*Analysis.*—Calcd. for $C_{17}H_{19}O_6N_4Cl$: C, 49.69; H, 4.66; N, 13.64. Found: C, 49.10; H, 5.02; N, 13.80.

Figure 3:
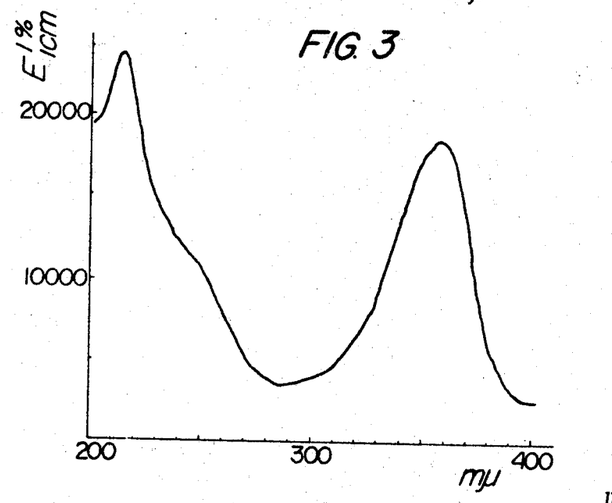

The ultraviolet adsorption in ethanol is shown in FIG. 3, $\lambda_{max.}^{C_2H_5OH}$ 214 m$\mu$ ($\epsilon_{max.}=24{,}500$) and 358 m$\mu$ ($\epsilon_{max.}=18{,}500$)

The infrared spectrum in Nujol is shown in FIG. 4.

Example 3.—1a-phthaloylglutamylmitomycin C 1 g. of mitomycin C and 0.8 g. of phthaloylglutamic acid anhydride were dissolved in 20 ml. of pyridine. Standing for 4 days at room temperature, the reaction mixture was concentrated in vacuo and the resulting concentrate dissolved in MeOH:CHCl$_3$ (1:3). The chromatographic treatment carried out using silicic acid. 1.5 g. of the brownish amorphous powder of 1a-phthaloylglutamyl-mitomycin C was obtained.

*Analysis.*—Calcd. for $C_{28}H_{27}O_{10}N_5$: C, 56.66; H, 4.59; N, 11.80. Found: C, 55.66; H, 5.22; N, 11.01.

Figure 5:
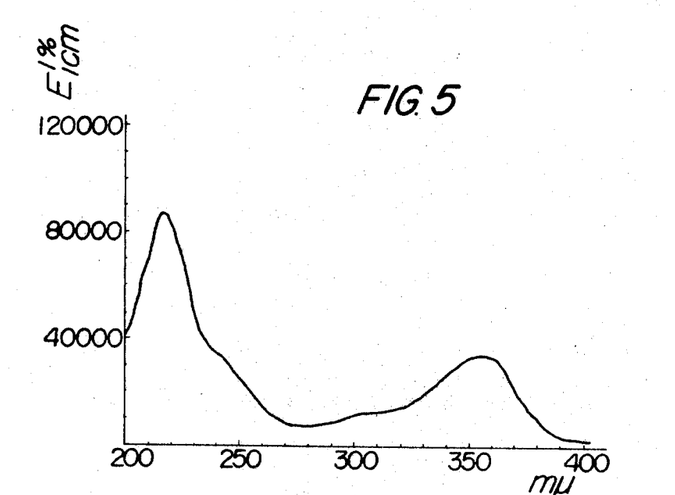

The ultraviolet adsorption in ethanol is shown in FIG. 5.

$\lambda_{max.}^{C_2H_5OH}$ 218 m$\mu$ ($\epsilon_{max.}$=86,000) and 357 m$\mu$ ($\epsilon_{max.}$= 3300)

Figures 6, 8:
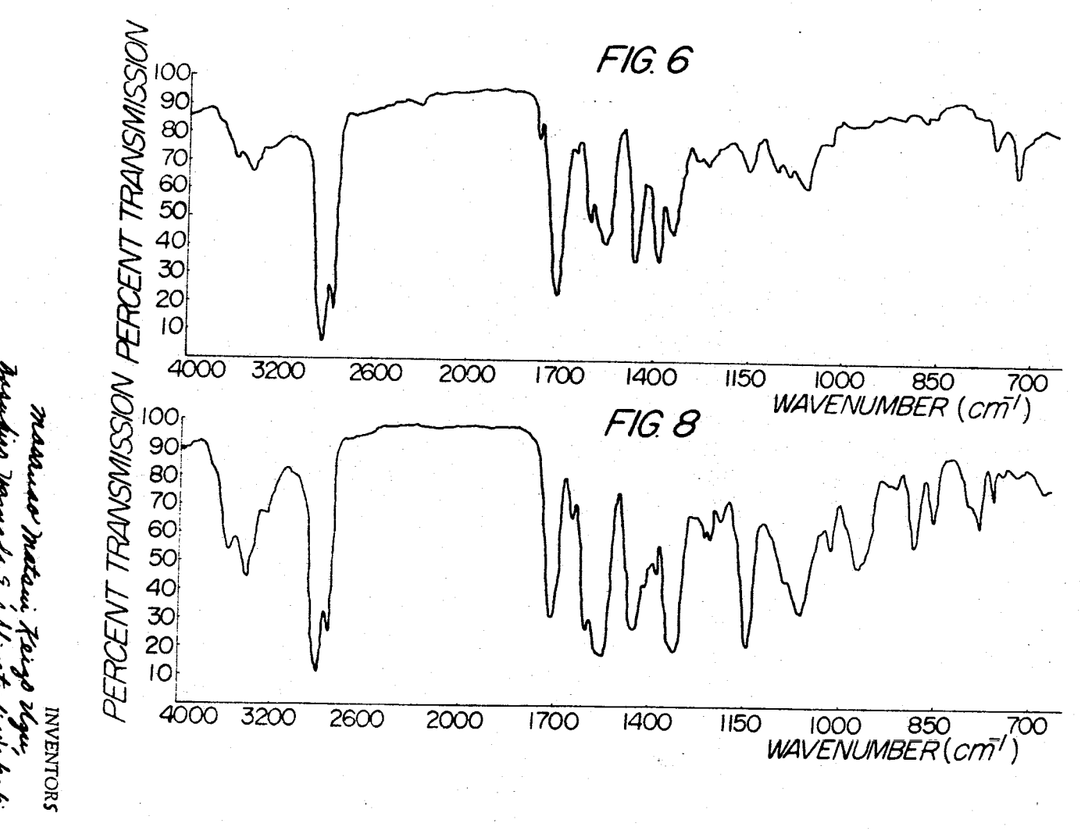

The infrared spectrum in Nujol is shown in FIG. 6.

Example 4.—1a-methanesulfonylmitomycin C 1 g. of mitomycin C was dissolved in 20 ml. of pyridine and added with 400 mg. of triethylamine. To this solution, 350 mg. of methanesulfonylchloride in 5 ml. of benzene was added dropwise on stirring and cooling. Stirring for still 20 min., the precipitated triethylamine-hydrochloride was filtered off, and the filtrate was concentrated. The resulting paste-like residue was dissolved in ethylacetate. The chromatographic treatment was carried out using silicic acid. The band was developed and eluated by acetone:ethylacetate (1:2), whereby the product and unreacted mitomycin C were separated. The first eluate was concentrated and added with petroleum ether. The precipitate was separated and dried. 850 mg. of purple amorphous powder of 1a-methane sulfonylmitomycin C was obtained.

*Analysis.*—Calcd. for $C_{16}H_{20}O_7N_4S$: C, 46.59; H, 4.88; N, 11.16. Found: C, 46.35; H, 5.08; N, 11.50.

Figure 7:
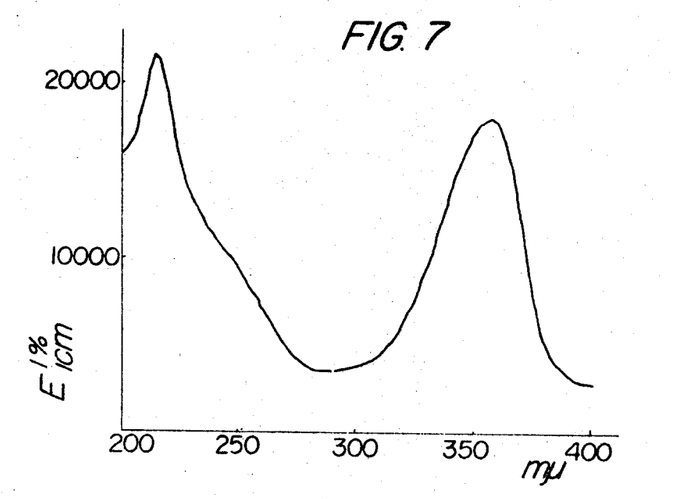

The ultraviolet adsorption in ethanol is shown in FIG. 7, $\lambda_{max.}^{C_2H_5OH}$ 215 m$\mu$ ($\epsilon_{max.}$=22,000) and 356 m$\mu$ ($\epsilon_{max.}$= 17,800)

The infrared spectrum in Nujol is shown in FIG. 8.

Example 5.—1a-p-toluenesulfonylmitomycin C 1a-p-toluenesulfonylmitomycin C was prepared by the same process as in Example 4 except using p-toluenesulfonic acid chloride in place of methanesulfonylchloride.

*Analysis.*—Calcd. for $C_{22}H_{24}O_7N_4S$: C, 54.08; H, 4.95; N, 11.47. Found: C, 53.85; H, 4.86; N, 11.07.

Figure 9:
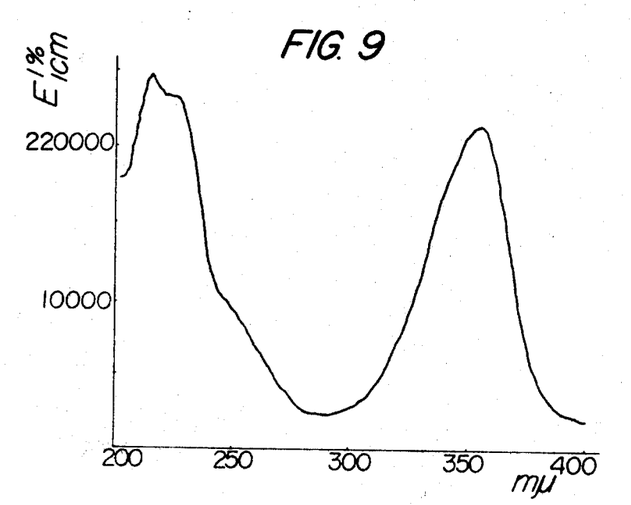

The ultraviolet adsorption in ethanol is shown in FIG. 9, $\lambda_{max.}^{C_2H_5OH}$ 216 m$\mu$ ($\epsilon_{max.}$=24,000) and 354 m$\mu$ ($\epsilon_{max.}$= 21,000)

Figure 10:
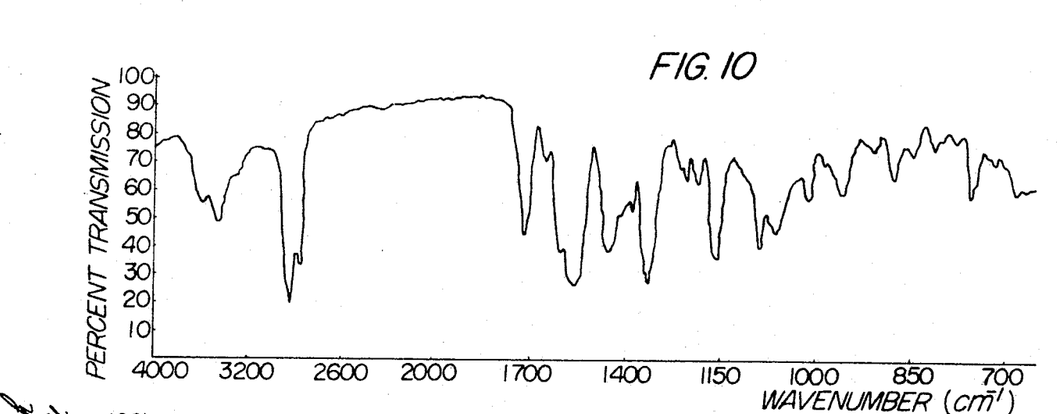

The infrared spectrum in Nujol is shown in FIG. 10.

Example 6.—1-hydroxy-2,7-diaminomitosene 1 g. of mitomycin C was dissolved in 0.1 N hydrochloric acid. After standing for 15 min. at room temperature, the reddish purple solution was adjusted to be pH 9 by adding aqueous ammonia. The solution was kept in the refrigerator and the resultant precipitate was separated and washed with a small amount of acetone. 850 mg. of crude 1-hydroxy-2,7-diaminomitosene was obtained.

The crude product was dissolved in acetone and adsorbed on silicic acid in a column. The development was carried out by using acetone as the solvent and chromatogram of 3 bands was observed. The elution was carried out by using also acetone as solvent and the first eluate was concentrated in vacuo. The resultant dark reddish needle crystal of 1-hydroxy-2,7-diaminomitosene was separated. Yield: 550 mg.

*Analysis.*—Calcd. for $C_{14}H_{16}O_5N_4$: C, 52.49; H, 5.04; N, 17.49. Found: C, 52.35; H, 5.20; N, 17.30.

Figure 11:
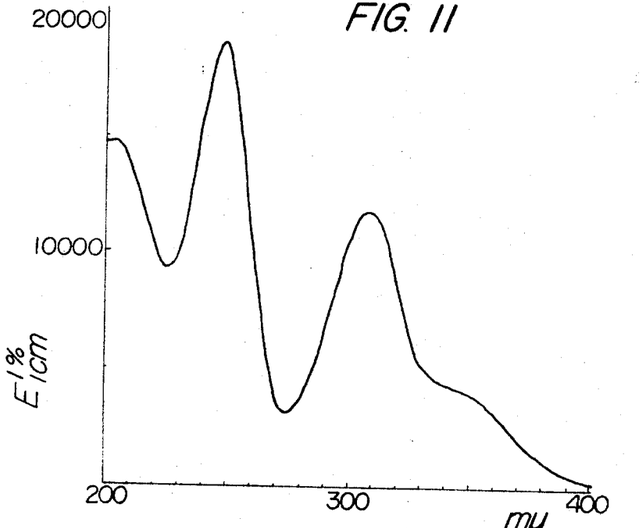

The ultraviolet adsorption in ethanol is shown in FIG. 11, $\lambda_{max.}^{C_2H_5OH}$ 248 m$\mu$ ($\epsilon_{max.}$=19,100) and 308 m$\mu$ ($\epsilon_{max.}$= 11,800)

Figure 12:
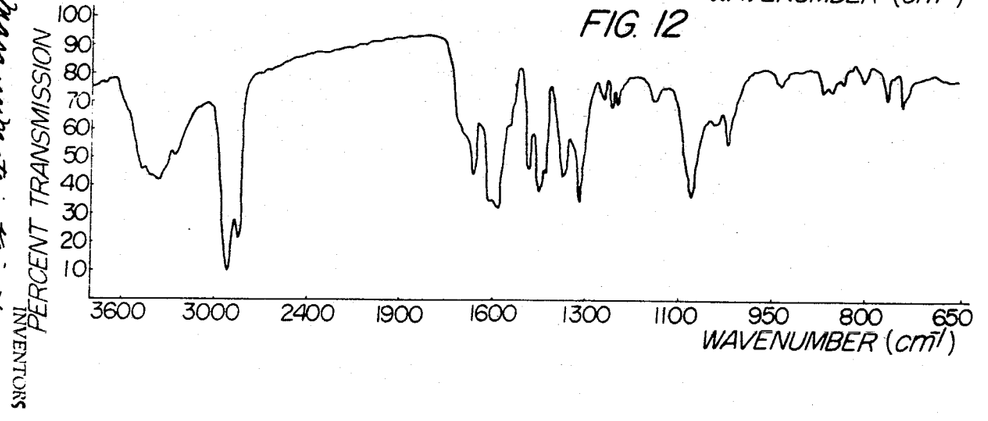

The infrared spectrum in Nujol is shown in FIG. 12.

The antibacterial activities and toxicity of the above exemplified derivatives are shown in Tables 1 and 2 respectively.

TABLE 1.—ANTIBACTERIAL ACTIVITIES OF MITOMYCIN DERIVATIVES

| X | $NH_2-$ | $NH_2-$ | $NH_2-$ | $NH_2-$ | $NH_2-$ | |
| Y | $CH_3O-$ | $CH_3O-$ | $CH_3O-$ | $CH_3O-$ | $CH_3O-$ | |
| Z | $CH_3-CO-$ | $ClH_2C-CO-$ | $HOOC-(CH_2)_2-CH-CO$ (phthalimido) | $H_3C-SO_2-$ | $H_3C-\langle\rangle-SO_2-$ |  |
|---|---|---|---|---|---|---|
| Antibiotics | | | | | | |
| Staphylococcus aureus 209P | 0.39 | 0.195 | 3.12 | 25 | 6.25 | 3.12 |
| Sarcina lutea PcI 1001 | 0.39 | 0.195 | 3.12 | 6.25 | 1.56 | 1.56 |
| Bacillus subtilis ATCC 6633 | 0.195 | 0.097 | 2.12 | 25 | 25 | 3.12 |
| Salmonella typhi 379 | 1.56 | 0.39 | 25 | >50 | >50 | 12.5 |
| Shigella flexneri Za 3196 | 0.024 | 0.024 | 0.097 | 3.12 | 3.12 | 0.097 |
| Klebsiella pneumoniae 0/10 | 3.12 | 1.56 | 25 | >50 | >50 | 12.5 |
| Proteus X19 | 3.12 | 0.39 | 12.5 | >50 | >50 | 25 |
| Escherichia coli K-12 | 1.56 | 0.28 | 25 | >50 | >50 | 50 |
| Pseudomonas aeruginosa 35 | 6.25 | 0.048 | 50 | >50 | >50 | |
| Vibrio comma 62 | 0.78 | 3.12 | 3.12 | 3.12 | 1.56 | 1.56 |
| Mycobacterium tuberculosis 607 | 0.097 | 0.097 | 1.56 | 6.25 | 0.195 | 0.195 |
| Streptococcus hemolyticus 68 | 0.78 | 0.097 | 6.25 | 6.25 | 3.12 | 1.56 |
| Streptococcus faecalis 5 | 0.78 | 0.39 | 6.25 | 0.39 | 25 | 6.25 |
| Diplococcus pneumoniae 1–19 | 0.78 | 0.39 | 0.78 | 0.78 | 0.39 | 0.39 |
| Corynebacterium diphtheriae | 0.097 | 0.024 | 0.78 | 0.78 | 6.25 | 0.78 |

TABLE 2.—TOXICITY OF MITOMYCIN DERIVATIVES

| | | | | | | |
|---|---|---|---|---|---|---|
| X | NH₂— | NH₂— | NH₂— | NH₂— | NH₂— | |
| Y | CH₃O— | CH₃O— | CH₃O— | CH₃O— | CH₃O— | |
| Z | CH₃—CO— | ClH₂C—CO— | HOOC—(CH₂)₂—CH—CO—N(benzene-dicarbonyl) | H₃C—SO₂ | H₃C-(C₆H₄)-SO₂— | (mitomycin C structure) |
| Mitomycin derivatives LD₅₀ (Mouse), mg./kg. | 27 | 23.75 | >100 | >100 | >100 | 100 |

What we claim is:
1. The chemical compound 1a-phthalaylglutamylitomycin C having the formula:

References Cited

UNITED STATES PATENTS 3,226,393  12/1965  Meyer et al. ____ 260—326.3 XR
3,179,671  4/1965  Mowat et al. ________ 260—319

OTHER REFERENCES

Burger: Medicinal Chemistry, page 43 (1960), R.S. 403B8.

Skorokhodov et al.: Chemical Abstracts, vol. 57, col. 8555 (1962).

Elderfield: Heterocyclic Compounds (1950), QD 400E4, p. 71, vol. 1.

Noller: Chemistry of Organic Compounds (1957), QD 253N65, p. 104.

Wagner et al.: Synthetic Organic Chemistry (1953),

Webb et al.: J. Am. Chem. Soc., vol. 84, pp 3185–88 QD 262W24, pp. 566, 822–23. (1962).

Tulinsky, J.: Am. Chem. Soc., vol. 84, p. 3188 (1962).

ALEX MAZEL, *Primary Examiner.*

J. A. NARCAVAGE, *Assistant Examiner.*

U.S. Cl. X.R.

260—326.3, 999